J. G. BARNES.
DISK HARROW OR TERRACER.
APPLICATION FILED JULY 10, 1920.
1,393,336.
Patented Oct. 11, 1921.
2 SHEETS—SHEET 1.
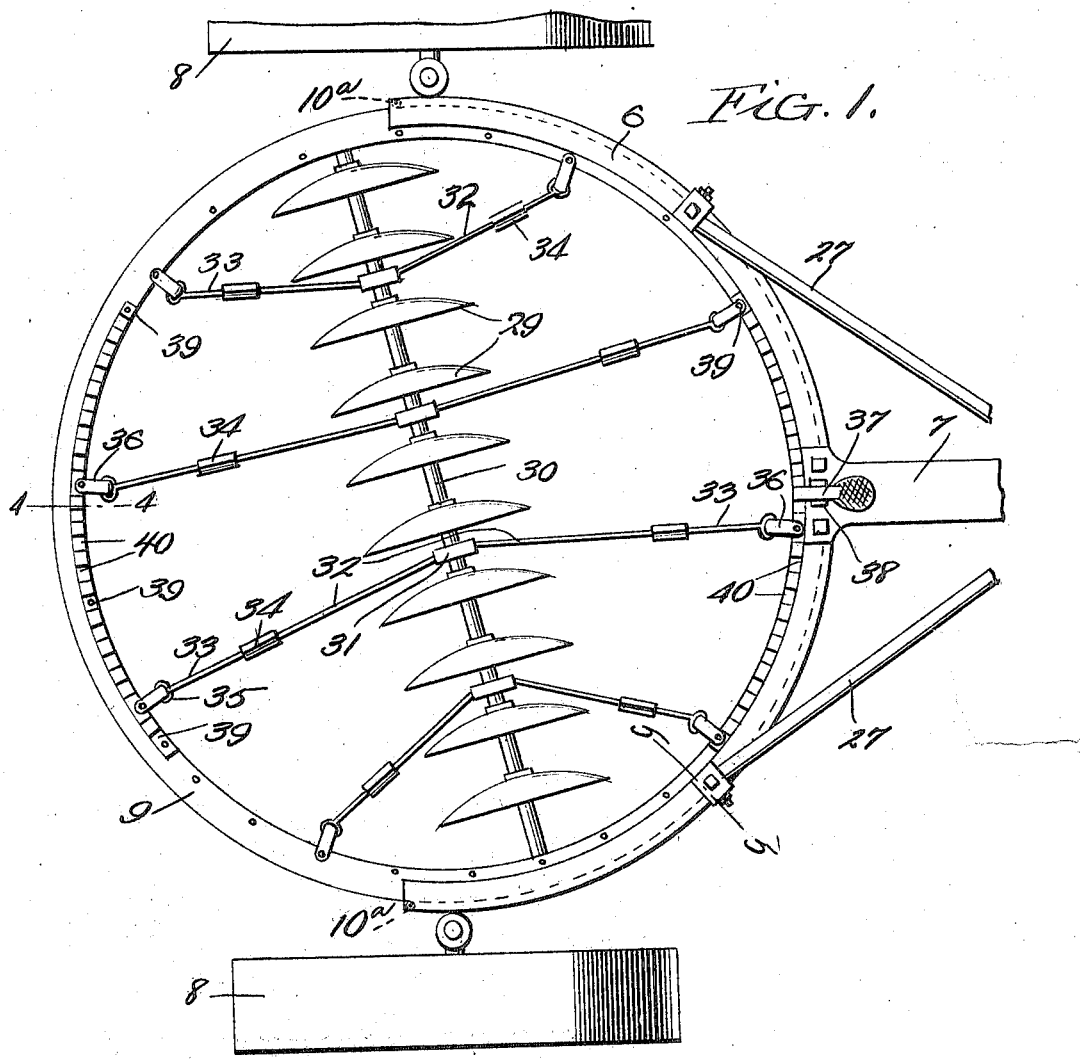
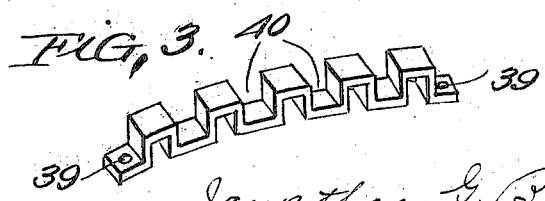
*Jonathan G. Barnes* INVENTOR.

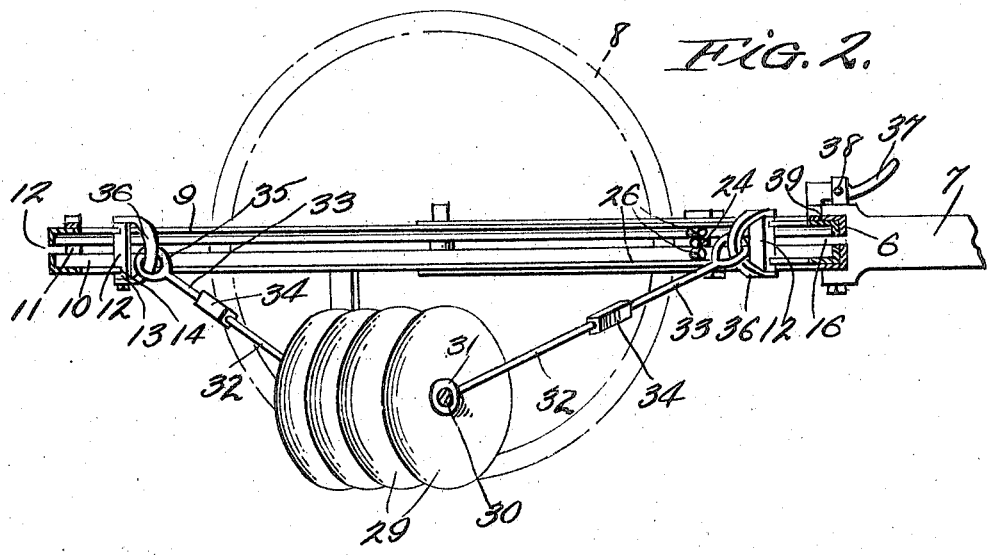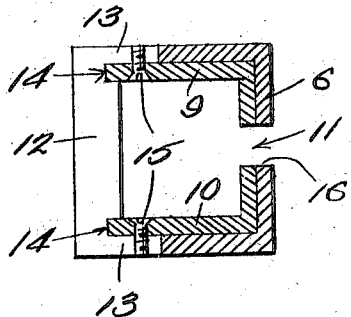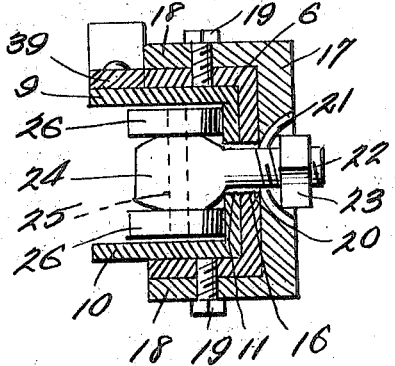

UNITED STATES PATENT OFFICE.

JONATHAN G. BARNES, OF LAREDO, TEXAS.

DISK HARROW OR TERRACER.

1,393,336.  Specification of Letters Patent.  Patented Oct. 11, 1921.

Application filed July 10, 1920. Serial No. 395,296.

*To all whom it may concern:*

Be it known that I, JONATHAN G. BARNES, a citizen of the United States, residing at Laredo, in the county of Webb and State of Texas, have invented certain new and useful Improvements in Disk Harrows or Terracers, of which the following is a specification.

My invention relates to a disk harrow or terracer.

The main object is to provide a structure which is generally improved in structure, more efficient in operation and capable of performing additional functions and being otherwise more advantageous.

Other objects are to provide a machine which will throw the soil in one direction, will work twice as fast as present machines, will save "doubling", will leave the ground smooth and yet is not too heavy and capable of perfect work in a single operation; one in which the depth of cut may be governed without varying the angle of the disks, and one which is reversible although a one-way disk harrow.

Additional objects and advantages will appear hereinafter as the description progresses in relation to accompanying drawings illustrating one preferred embodiment.

In said drawings,

Figure 1 is a plan view;

Fig. 2 is a longitudinal sectional view;

Fig. 3 is a detail perspective view of the rack bar which may be employed for the adjusting feature of the harrow;

Fig. 4 is a cross-sectional view on the line 4—4 of Fig. 1, and

Fig. 5 is a cross-sectional view on the line 5—5 of Fig. 1.

Referring specifically to the drawings wherein like reference characters designate like or corresponding parts, a main frame 6 is employed, preferably being arcuate and more than half of a circle and U-shaped in cross section with the groove or way extending inwardly from the inner face or periphery. A draft tongue 7 of any approved construction is rigidly fastened to the center of the frame. Mounting this frame are relatively wide wheels 8 which are journaled from the frame 6 in any suitable manner, but preferably by any suitable means which will permit the height of the wheels to be varied or adjusted relatively to the frame for an obvious purpose.

A ring or harrow supporting frame is composed of the upper and lower sections 9 and 10 which collectively form a channel U-shaped in cross-section but spaced apart at the free edges of their vertical walls to provide a continuous slot 11. In order to rigidly secure sections 9 and 10 together, cleats or bars 12 are provided, preferably having arms 13 overlapping the horizontal walls of sections 9 and 10, being notched at 14 and receiving said walls as shown in Fig. 4 and said walls and arms 13 being secured together by means of the screws 15. Frame 6 is also formed in sections, similar to the upper and lower sections 9 and 10 and spaced apart at 16 to coincide with the space or continuous slot 11. Frame 9—10 is rotatable within the frame 6, and preferably on friction-reducing rollers $10^a$ of suitable construction provided on section 6 and movable on vertical pivots. U-shaped brackets 17 surround the sections of section 6 and has its arms at 18 secured to such sections by means of bolts or the like 19. Openings or apertures 20 are provided in the main arms of the brackets 17 in which dished reinforcing members 21 are provided. Bolts or other fastening means 22 pass through the openings 20 and the spaces 11 and 16, having fastening nuts thereon at 23. The heads 24 of these bolts are disposed within the channel of frame 9—10 and mounts a vertical pin 25 which journals friction-reducing rollers 26 which engage or ride on the inner faces of the vertical walls of the sections of frame 9—10. The desired adjustment or pressure between the rollers 26 and frame 6 may be regulated through manipulation of the lock nuts 23.

In order to rigidly brace the tongue or pole 7, suitable struts or brace arms 27 are connected thereto in any desired way and to brackets 17.

The soil is treated by any suitable form of blades or disks, for instance by the gang or plurality of dished disks 29, removably or in any desired manner mounted upon a shaft 30, journaled in bearings 31. Extending from bearings 31 are arms or rods 32 forming parts of turnbuckles which are completed by rods 33 and joining sleeves or turnbuckles proper 34 screw threaded to the rods 32 and 33. Rods 33 are connected by eyelets 35 to hangers 36 which are fastened to the brackets 12.

In order to lock the frame 9—10 in adjusted positions relative to the frame 6, a lock lever 37 is pivoted upon the tongue 7 or frame 6 at 38. A rack bar is also provided and may be of the specific form shown in Fig. 3, being made from a bar of bendable metal and shaped to have tangs 39 through which fastening means may pass to secure the same upon the ring section 9, but out of the path of movement of the section 6, and so as to have notches 40 into which said lever falls by gravity. Several of these rack bars may be used, if desired.

As will be apparent the implement may be used generally as a harrow as well as particularly as a terracer. It is drawn along in any suitable manner so that the disks 29 will treat the soil. As the frame 9—10 and supported harrow mechanism may be turned within the frame 6, the disks may be placed at any desired angle, the parts being held against displacement by means of the engagement of lever or pawl 37 with the proper notch 40. The relative movement of the frame 9—10 and frame 6 is easy since the contact occurs between the rollers 10ª and sections 9 and 10, and between the rollers 26 and sections 9 and 10. The height of the disks 29, in order to regulate the depth of cut may be varied through manipulation of a raising and lowering mechanism of a well known type. The steering of the machine is accomplished through any suitable means and therefore no particular means has been set forth in the drawings.

Since merely the preferred embodiment of the invention has been illustrated and described, it is to be understood that changes in the details thereof may be made within its spirit and scope.

I claim:—

1. An agricultural implement having a first frame provided with a groove, a second frame, said second frame extending into and movable in said groove, rollers between said frames, a rack bar on one of the frames, a pawl on the other frame to engage the rack bar, said frames each comprising separate sections, bolts passing through the spaces intermediate the said sections and having nuts engaging one of the frames and rollers engaging the other frame, brackets joining the sections of the second frame having grooves receiving the sections thereof, hangers supported by the brackets, rods extending from the hangers, soil treating means having a shaft, bearings journaling said shaft, said rods bracing said bearings and said rods being in sections, and turnbuckles connecting the sections of said rods.

2. An agricultural implement having a main frame of substantially semi-circular shape, a circular frame revolving within the main frame, registering slots through said frame, brackets attached to the main frame having openings registering with the slots, bolts passing through the frames and brackets, friction rollers journaled to the inner ends of the bolts engaging the inner face of the circular frame, and means for adjusting the pressure of the rollers with respect to the frame.

3. An agricultural machine having a main frame of substantially semi-circular shape, a circular frame revolving within the main frame, registering slots through the frames and fastening means extending through the slots, said means having friction rollers engaging the inner surface of the circular frame permitting free revolving movement thereof.

In testimony whereof, I have affixed my signature in the presence of two witnesses.

JONATHAN G. BARNES.

Witnesses:
 JOHN L. DANNELLEY,
 J. N. WORSHAM.